Patented Dec. 15, 1931

1,836,689

UNITED STATES PATENT OFFICE

CYRIL J. STAUD AND RUSSELL H. VAN DYKE, OF ROCHESTER, NEW YORK, ASSIGNORS TO EASTMAN KODAK COMPANY, OF ROCHESTER, NEW YORK, A CORPORATION OF NEW YORK

PROCESS FOR ESTERIFICATION OF CELLULOSE AND PRODUCTS RESULTING THEREFROM

No Drawing.    Application filed April 9, 1930. Serial No. 442,995.

This invention relates to a process for the esterification of cellulose and the products resulting therefrom in which process selenic acid is employed as a catalyst.

There have been three general methods employed for the manufacture of cellulose esters. The first method consists in treating the cellulose with acetic anhydride per se in order to effect the acetylation; this acetylation being conducted in a heated sealed tube, or by refluxing a solution of cellulose and acetic anhydride. The second method which is now generally employed for the manufacture of cellulose acetate consists usually in treating the cellulose either in a pre-treated or unpre-treated form with a solution containing acetic anhydride, acetic acid and a suitable catalyst. In this process cellulose, whether it be from cotton, wood pulp or other type of cellulosic material, gradually goes into colloidal solution in the acetylation mixture to give a viscous solution technically known as "dope". There are numerous catalysts which have been employed in the past for effecting this acetylation such as the mineral acids and particularly the acid chlorides such as zinc chloride, sulphuryl chloride, thionyl chloride, perchloric acid, the phosphorous chlorides and others. The cellulose acetate is isolated from the dope by precipitation in water or other non-solvents. The third general method involves the presence in the acetylation bath of sufficient non-solvents of the cellulose triacetate such as benzol, carbontetrachloride and the like to prevent the cellulose acetate formed from going into solution. By this process cellulose acetate is manufactured in a fibrous form, that is, in a form having an appearance similar to that of the untreated cotton or wood fibre.

The cellulose acetate obtained by most of the above methods contains approximately 44.8% acetyl and is soluble in chloroform, pyridine, tetrachlorethane, aniline, ethylene, chloride-methanol, and in other organic liquids.

An object of the present invention is to provide a process for the preparation of esters of cellulose having new unusual qualities. Another object of this invention is to provide a process for the acetylation of cellulose in which a new type of catalyst is employed. A further object of this invention is to obtain cellulose esters of high purity. A still further object of this invention is to provide cellulose acetate having new solubility characteristics. Other objects will hereinafter appear.

We have found that selenic acid, $H_2SeO_4$ is a catalyst for the esterification of cellulose, and as such reacts in a totally different manner than any of the catalysts which have been used heretofore. As has been brought out in the above discussion of the prior art it will be noted that if esterification is conducted in the usual maner, i. e., in the presence of acetic acid, acetic anhydride, and the usual catalyst, the cellulose goes into colloidal solution. In order to prevent such a solution it has been necessary, as above described, in the third general group of processes that a nonsolvent be present in the acetylating bath in a sufficient quantity to prevent solution of the esters. We have found, however, that by the use of selenic acid as a catalyst it is not necessary to add a non-solvent to the esterifying bath in order to prevent solution of the cellulose esters. By conducting the esterification in a manner similar to that described under the second general process but with selenic acid as a catalyst a cellulose ester in fibrous form will be obtained. This is very unexpected when it is realized that selenic acid is the only catalyst known at present which when used in the ordinary dope forming acetylation bath produces a cellulose acetate which is insoluble in the acetylating solution even though there is present no non-solvent media. This is even more surprising when it is realized that the closely related acid, sulfuric acid, in a similar acetylation bath without selenic acid will produce a cellulose acetate in solution.

In effecting the acetylation or other esterification of cellulose with the use of selenic acid as a catalyst, it is not material what type of cellulose is used for esterification. Cotton, wood pulp, or other cellulose containing bodies, whether in pre-treated or unpretreated form, may be utilized. As would be expected, however, cotton linters and, preferably pre-treated cotton linters appear to give a more uniform and therefore a better product than other types of cellular bodies which are not so treated.

This catalyst may be used not only in the esterification of cellulose acetate, but also in the preparation of cellulose propionate and cellulose butyrate, these esters being prepared through the action upon cellulose of their respective anhydrides in the presence of their corresponding acids and selenic acid as a catalyst.

The cellulose triacetate which is obtained by the acetylation of cellulose with selenic acid as a catalyst is unusual, not only due to its being obtained in a fibrous form, but also in its striking solubility characteristics. For example, it is insoluble in chloroform, chloroform-alcohol (85:15), 1–4 dioxan, and in trichloroethylene. The fibres of the cellulose triacetate swell but do not dissolve in tetrachloroethane, ethylene chloride and m-cresol. It is found to be soluble in warm pyridine but this solution jells upon being cooled. It is soluble in warm aniline and after precipitation in ethanol, from an aniline or pyridine solution, and subsequent washing and drying, the cellulose acetate is found readily soluble in chloroform.

We have discovered another peculiarity in the use of this catalyst in that when it is used in conjunction with catalysts ordinarily utilized to produce a cellulose acetate directly in dope form, it prevents solution of the cellulose esters. For instance, cellulose acetylated in a bath containing acetic anhydride, acetic acid, and a mixed catalyst containing sulphuric, phosphoric and selenic acid, is obtained in a fibrous form having the appearance of the original fibres, somewhat swollen. There is every indication that the cellulose acetates obtained by our process are of high purity, i. e., the esters if prepared from pure acetic anhydride, acetic acid, and selenic acid or a mixed catalyst containing selenic acid will be substantially undegraded.

We shall now give two examples of conducting this process, but it will be understood that they are merely representative of numerous examples that might be given for effecting esterification in the presence of selenic acid as a catalyst. It will be realized, therefore, that we are not to be restricted by the details or proportions therein given except as they may be indicated in the claims that are appended hereto.

*Example 1.*—To 5 parts of air dried cotton linters there was added a mixture consisting of 25 parts of 99% acetic anhydride, 35 parts of glacial acetic acid and $\frac{1}{10}$th part of selenic acid. The temperature prior to the addition of the cellulose was 27° C. and after the addition of the cellulose the temperature increased in a period of 20 minutes to 32 degrees C. after which it began to decrease. The temperature was then raised to 50° C. and maintained at that temperature for 23 hours.

At the close of this period the cellulose was present in the fibrous form, although the fibres appeared to be somewhat swollen.

The fibres were filtered off, washed with water until neutral to brom-thymol-blue, dehydrated with alcohol and ether and dried. Analysis showed that there was 44.2% acetyl combined with the cellulose, while the theoretical percentage of cellulose triacetate is 44.8%.

This cellulose triacetate was found to be insoluble in chloroform, trichlorethylene, chloroform-alcohol (85:15) and 1–4 dioxan. While the fibres were found to only swell in tetrachlorethane, ethylene chloride and m-cresol, they were soluble in warm pyridine, but upon cooling the solution jelled. This cellulose triacetate was likewise soluble in warm aniline and after precipitation in ethanol from an aniline solution and being washed and dried, it was found to be readily soluble in chloroform.

*Example 2.*—The materials used in this preparation were the same as those used in Example 1, with the exception that $\frac{5}{10}$ths parts of selenic acid was used instead of the $\frac{1}{10}$th part employed in Example 1. Acetylation was complete, as indicated by testing with polarized light after 3½ hours at a temperature of 50° C. The product was isolated in a manner similar to that described in Example 1, and upon analysis was found to contain 43.8% acetyl.

The solubility characteristics of cellulose acetate as prepared under this example are quite similar to the solubilities given under Example 1, except that the cellulose acetate in this case is somewhat more soluble in pyridine. The specific rotation of the cellulose triacetate, obtained as described in Example 2, dissolved in a 1% pyridine solution in a 2 dm. tube, using the 546.1 mu line as illuminant was −46.0°.

On analytical examination it was determined that cellulose esters prepared from esterifying baths containing selenic acid contained from 1 to 5 per cent of selenium calculated as $H_2SeO_4$. The solubility characteristics of these esters may in part be due to the presence of this small amount of selenium.

From a consideration of the above disclosure it will be realized that any process for the preparation of cellulose esters in which selenic acid is employed as a catalyst will come within the scope of this invention as well as the cellulose esters obtained by such a reaction.

What we claim as new and desired to be secured by Letters Patent of the United States is:

1. A process for the manufacture of cellulose esters which comprises conducting the acetylation of the cellulose in the presence of selenic acid.

2. A process for the manufacture of cellulose acetate which comprises conducting the acetylation of the cellulose in the presence of selenic acid.

3. A process for the manufacture of cellulose esters which comprises acetylating the cellulose in the presence of an anhydride of a lower fatty acid, a lower fatty acid, and selenic acid.

4. A process for the manufacture of cellulose actate which comprises acetylating cellulose in the presence of acetic anhydride, acetic acid and selenic acid.

5. A process for the manufacture of cellulose acetate which comprises conducting the acetylation of the cellulose in the presence of a mixed catalyst containing selenic acid.

6. A process for the manufacture of cellulose esters which comprises conducting the acetylation of the cellulose in the presence of a mixed catalyst containing selenic acid.

7. A composition of matter comprising cellulose acetate which is insoluble in chloroform, chloroform-alcohol (85%:15%), 1-4 dioxan and in trichloroethylene, and is soluble in warm pyridine and warm aniline.

8. A composition of matter comprising a cellulose ester containing from 1 to 5% of selenium calculated as selenic acid.

9. A composition of matter comprising cellulose acetate containing from 1 to 5% selenium calculated as selenic acid.

Signed at Rochester, New York, this 31st day of March, 1930.

CYRIL J. STAUD.
RUSSELL H. VAN DYKE.